United States Patent [19]

Malachosky et al.

[11] Patent Number: 5,645,730
[45] Date of Patent: Jul. 8, 1997

[54] ACID WASTEWATER TREATEMENT

[75] Inventors: Edward Malachosky, Coppell; Ronnie D. Gordon, Richardson, both of Tex.

[73] Assignee: Envirocorp Services & Technology, Inc., Houston, Tex.

[21] Appl. No.: 638,716

[22] Filed: Apr. 29, 1996

Related U.S. Application Data

[63] Continuation-in-part of Ser. No. 570,231, Dec. 11, 1995, which is a continuation-in-part of Ser. No. 391,202, Feb. 21, 1995, Pat. No. 5,474,684.

[51] Int. Cl.$^6$ .................................................. C02F 1/64
[52] U.S. Cl. ...................... 210/665; 210/667; 210/688; 210/724; 210/726; 210/912; 405/129; 588/256
[58] Field of Search ................................. 210/709, 710, 210/724, 725, 727, 733, 734, 751, 908, 911, 912–914, 667, 688, 665, 726; 405/129; 588/256, 257

[56] References Cited

U.S. PATENT DOCUMENTS

| | | | |
|---|---|---|---|
| 3,720,609 | 3/1973 | Smith et al. | 588/256 |
| 3,984,312 | 10/1976 | Dulin et al. | 210/751 |
| 4,116,705 | 9/1978 | Chappell | 588/256 |
| 4,118,243 | 10/1978 | Sandesara | 106/109 |
| 4,518,508 | 5/1985 | Conner | 210/911 |
| 4,530,765 | 7/1985 | Sabherwal | 210/912 |
| 4,741,834 | 5/1988 | Spangle et al. | 210/688 |
| 4,971,702 | 11/1990 | Renk | 210/684 |
| 5,051,031 | 9/1991 | Schumacher et al. | 210/751 |
| 5,098,532 | 3/1992 | Thompson et al. | 204/98 |
| 5,137,640 | 8/1992 | Poncha | 210/724 |
| 5,298,168 | 3/1994 | Guess | 210/713 |
| 5,512,257 | 4/1996 | Frey | 210/912 |

OTHER PUBLICATIONS

Removal of Lead & Cadmium Aqueous Waste STreams Using Granular Activated Carbon (GAC) Column, Reed et al, 13 Environmental Progress, pp. 61–64, Feb. 1994.

Arsenic III and Arsenic V Removal From Solutions by Pyrite Fines, Zouboulis et al, Separation Science & Technology, vol. 28, pp. 2449–2463, 1993.

Arsenic, Pollutant Removal Handbook, pp. 56–58 prior to 1994.

Product Bulletins Material Safety Data Sheets 2000–S Coastal Guard 766, Coastal Fluid Technologies, Inc., prior to 1994.

Antifreeze System Maintenance, Coastal Fluid Technologies, Inc., 1994.

Removal of Arsenic From Geothermal Fluids By Adsorptive Bubble Flotation with Colloidal Ferric Hydroxide, DeCarlo et al, Environ. Sci. Technology, vol. 19, pp. 539–544, 1985.

Crystallization solves an arsenic problem, Chemical Engineering, Mar. 1996, p. 23.

As(V) Removal From Aqueous Solutions By Fly Ash, Diamadopoulos, Wat. Res., vol. 27, No. 12, pp. 1773–1777.

*Primary Examiner*—Peter A. Hruskoci
*Attorney, Agent, or Firm*—Guy McClung

[57] ABSTRACT

A process for treating acid wastewater containing heavy metals has been invented, the process including adding fly ash to the acid wastewater to reduce heavy metals content of the acid wastewater. In one aspect the acid wastewater contains soluble iron and adding fly ash reduces the level of soluble iron. In one aspect the acid wastewater contains sulfate ions and adding fly ash reduces the sulfate ion level. In one aspect solid silicate salts are added to the acid wastewater. Preferably undesirable very hydrous iron hydroxide precipitate is not formed. In certain aspects the pH of the acid wastewater is raised to an environmentally acceptable level. In one aspect the process is a batch process. In another aspect the process is a continuous process.

13 Claims, No Drawings

ACID WASTEWATER TREATEMENT

RELATED APPLICATION

This is a continuation-in-part of U.S. patent application Ser. No. 08/570,231 entitled "Heavy Metals Removal" filed on Dec. 11, 1995 which is a continuation-in-part of U.S. patent application Ser. No. 08/391,202 filed Feb. 21, 1995, now U.S. Pat. No. 5,474,684 issued Dec. 12, 1995 entitled "Antifreeze Purification".

BACKGROUND OF THE INVENTION

1. Field of the Invention

This invention is directed to the chemical treatment of acid mine drainage to neutralize acid, remove metals, and remove sulfate ion without the formation of hydrous difficult-to-dewater iron hydroxide precipitate.

2. Description of Related Art

Acid mine drainage (AMD) is a major environmental problem where minerals and coal are mined and pyrite is present as an associated material. In the presence of oxygen and water, the pyrite oxidizes to produce sulfuric acid and soluble iron. The sulfuric acid reacts with other minerals in the associated ore, dissolving them and releasing additional heavy metal ions into solution. The resulting low pH solution containing these metals is an environmental hazard which is toxic to plants and animals.

AMD is a potential problem wherever minerals, coals, and other materials that contain pyrite are extracted from the earth. Pyrite, when exposed to air, oxidizes to produce ferrous ion, acid, and sulfate ion. The first step is shown in equation (1).

$$2FeS_2(s)+2H_2O+7O_2=4H^++4SO_4^{2-}+2Fe^{2+} \quad \text{(Eq. 1)}$$

The next step is the oxidation of ferrous ion to ferric ion as shown in equation (2).

$$4Fe^{2+}+O_2=4Fe^{3+}+2H_2O \quad \text{(Eq. 2)}$$

At a pH below 3.5, the bacterium, *Thiobacillus ferroxidans*, often catalyzes the oxidation of iron. The ferric ion dissolves additional pyrite and provides a cycle for the dissolution of pyrite, see equation (3).

$$FeS_2(s)+14Fe^{3+}+8H_2O=15Fe^{2+}+2SO_4^{2-}+16H^+ \quad \text{(Eq. 3)}$$

The dissolved iron, sulfate and acid become part of the tailings pore water, and the acid begins to dissolve other metals in the tailings or associated rocks and soil. Eventually, the acidic water with dissolved ions drains from the tailings into ground water or surface water. The process results in water with a low pH (e.g. less than 3) that contains high levels of iron and sulfate with lesser amounts of various metal ions including aluminum, arsenic, cadmium, chromium, copper, lead, magnesium, manganese, mercury, silver, selenium, and zinc. Left untreated, Acid Mine Drainage can pollute large volumes of ground and surface water. In some cases, the drainage may continue over decades.

In one prior art process, AMD water is treated with bases such as lime or sodium hydroxide. The principal ions in solution are ferrous and ferric, both of which are acidic. Upon treatment with base to neutralize the pH, the ferrous and ferric ions begin to precipitate and produce an unsightly, very hydrous, amorphous, semigelatinous hydrated iron hydroxide precipitate, see equation (4).

$$Fe^{x+}+2H_2O=Fe(OH)_x(s) \quad \text{(Eq. 4)}$$

where x=2 and 3.

Using this treatment procedure, large, undesirable, very hydrous, gelatinous flocs are produced that incorporate large quantities of water in their matrix making them difficult to handle and hard to dewater. Stoichiometric amounts of chemical are needed and low level contaminants may need a second stage treatment for complete removal.

Another chemical approach employs a zero valent metal such as scrap iron to precipitate the metals in solution through oxidation-reduction reactions. Other chemical or physical treatment approaches are ion exchange, activated alumina, and reverse osmosis. These approaches are often used as secondary steps to polish treatment streams where most of the contaminants have been removed.

Certain prior art biological treatments take advantage of sulfate reducing bacteria (SRB) to convert sulfate into sulfides. Metal sulfides are less soluble that the corresponding oxides and sulfide precipitation removes both from solution. The treated mixture needs a carbon source which is supplied by an organic waste material such as sewage.

In another similar prior art biological approach an artificial marsh is developed that consists of a series of ponds that are treated with compost, topsoil, and animal manure. Aquatic plants such as cattails are planted and crushed limestone is added to neutralize the acid. Cattails remove metals by adsorption, consumption and filtration. Algae and bacteria are able to grow easily in the marsh. Under reducing conditions, SRB reduces sulfate to sulfide and precipitates any metals in solution.

Biological treatments are used for low volume AMD generation started shortly after mining operations begin because of the large surface area requirements needed to establish and maintain the conditions required to successfully remove both metals and sulfates. Biological treatments are usually not suitable for large scale AMD projects that have been in operation for long periods of time.

The Resource Conservation and Recovery Act (RCRA), passed in 1976 and amended in 1984, classifies eight heavy metals as toxic. They are arsenic, barium, cadmium, chromium, lead, mercury, selenium, and silver. Hazardous wastes containing heavy metals are a major environmental problem because of their toxicity, persistence in the environment and potential mobility. Arsenic enters the environment from both natural and man-made sources, e.g. from natural sources such as the weathering of rocks, volcanoes, and as a by-product in the production of natural gas in some areas. Man made sources include herbicides; pesticides; smelting of zinc, copper and lead; fly ash from large scale burning of coal; tailings from mining wastes and use of industrial chemicals containing arsenic such as corrosion inhibitors.

Arsenic and its compounds are used in industry as pesticides, insecticides, and corrosion inhibitors. Many uses of arsenic have been discontinued because of environmental concerns about toxicity to both animals and humans. Nevertheless arsenic compounds are widely scattered throughout the environment. Continuing sources of arsenic atmospheric contamination are coal burning and copper smelting. The Environmental Protection Agency lists arsenic as a carcinogen. Federal and state regulations impose strict limits on arsenic concentrations in soil, air, and water. For example, the Toxic Substance Control Act (TSCA) has a reportable spill quantity of one pound for arsenic.

The effort to remove arsenic compounds from the environment includes efforts to remove it from antifreeze that protects the radiators of engines used with large compressors in the natural gas processing and pipeline industry. Antifreeze is a solution of glycols and water. One common glycol used in antifreeze is ethylene glycol. The amount of glycol used depends on the lowest anticipated winter temperature, typically in the range of forty to sixty percent glycol by volume. Since arsenic compounds have been used as corrosion inhibitors, many such industrial cooling systems are contaminated with arsenic.

If new antifreeze and new corrosion inhibitors are used, old solutions with arsenic in them must be disposed of in an environmentally safe manner. Burning arsenic contaminated antifreeze may increase air pollution in the same manner as burning coal with arsenic contaminated ash. The continued use of contaminated antifreeze poses a human health risk problem in the event of spills and worker exposure. An antifreeze spill of 1200 gallons containing 100 mg per liter arsenic is a reportable spill. The reportable spill quantity for ethylene glycol is 5000 pounds or 9000 gallons as antifreeze. The arsenic content of contaminated antifreeze may range to 500 mg per liter. The level of heavy metals may be up to 10 ppm. Volumes of contaminated antifreeze may range up to over 50,000 gallons at a single location.

Certain prior art processes are used to remove the build-up of minerals and metals (e.g. barium, cadmium, lead, chromium, copper) from used antifreeze solutions. The general processes involve use reverse osmosis technology; ultra-filtration technology; treatment with molecular sieves; treatment with ion exchange resins; and treatment with activated carbon. These processes may remove arsenic at low concentrations (e.g. at 10 to 20 ppm) but the treatment becomes uneconomical at high arsenic concentrations (e.g. at 25 ppm) because of the low efficiency and poor specificity. Certain prior art chemical treatment processes remove arsenic from antifreeze. One of these employs polyacrylate (a co-polymer of acrylic acid and acrylamide) and ethylene diamine tetra-acetic acid (EDTA) as its major components. Another process uses a formulation with sodium nitrite and potassium hydroxide as its major components. In one prior art process iron sulfate or alum is used to remove arsenic from wastewater. In certain nonanalogous prior art methods heavy metals are removed from water by increasing pH by adding a base (e.g. calcium hydroxide or magnesium hydroxide) until the metals precipitate.

SUMMARY OF THE PRESENT INVENTION

The present invention, in certain aspects, discloses processes to chemically treat acid wastewater and acid mine drainage (AMD) in which the acid is neutralized, the metals removed, and the sulfate ion removed without the formation of an undesirable very hydrous iron hydroxide gel or precipitate. In one aspect, the process uses a solid material that provides a basic component for neutralizing the acid and provides a site for metals and sulfates adsorption or ion exchange. In certain embodiments the solid treatment materials are fly ash from coal combustion and salts, e.g. basic solid silicates, e.g. sodium and potassium e.g. as commercially available from PQ Corp. The solid residue produced, which contains metals (e.g., but not limited to, aluminum, arsenic, cadmium copper, iron, magnesium, manganese, nickel, silver, selenium, zinc) and sulfate is removed from solution by conventional means such as, but not limited to, filtration. The resulting aqueous solution has reduced levels of metals and sulfates and may be suitable for discharge under the National Pollution Discharge Elimination System ("NPDES") discharge criteria for mining and dressing point source category. The NPDES is part of the Clean Water Act which regulates municipal and industrial water discharges and provides the regulatory framework for federal and state discharge permits. In addition, the solid residue is stable and may be disposed of in a landfill (satisfying regulations for landfills of the Resource Conservation Recovery Act) or further processed to recover valuable metal resources.

Certain processes according to this invention treat AMD or other sulfuric acid wastewater containing heavy metals with basic solids including fly ash from coal combustion and certain silicates, either separately or in combination. The treatment neutralizes acid while removing metal and sulfate ions. The solid residue remaining is easily separated from the treated AMD to provide a treated water that is pH neutral, has a very low heavy metal ion content, and a greatly reduced sulfate ion content. The solid containing the metals and sulfate ions can be disposed of in an appropriate landfill. Alternatively, they may be collected and further processed for iron and other metal recovery. The process can be a batch process conducted in a tank or container or it can be a continuous process in which AMD or other wastewater is continuously fed through a treatment vessel into which treating materials are continuously fed and from which flows treated product.

Preferred processes according to this invention do not form undesirable amorphous, semigelatinous very hydrous iron hydroxide precipitate. The amount of fly ash required depends on the starting pH of the AMD or acid wastewater and the starting concentration of soluble metals therein. Acid mine drainage is a highly variable material. Higher pH waters with lower concentrations of metals require much less fly ash. Lower pH waters with higher concentrations of metals require much higher treatments of fly ash. Even though the pH of AMD typically stabilizes in the 1 to 3 range, the concentration and type of heavy metals dissolved depends on the composition of the rock that the water flowed through. In addition, all fly ashes are not equal in their ability to trap metals and sulfates and neutralize acids. The amount of fly ash required depends on both the ability of the fly ash to absorb these metals and the type and amount of metals present.

It is, therefore, an object of at least certain preferred embodiments of the present invention to provide new, useful, unique, efficient, nonobvious processes for treating acid wastewaters, and in one particular aspect, the treatment of acid mine drainage.

The present invention in one embodiment, is a process that uses a chemical treatment to remove heavy metals from wastewater; including but not limited to wastewater containing oxygenated hydrocarbons (e.g. glycols, ethers, esters, alcohols, ketones, aldehydes, lactones, carboxylic acids and amides). In one aspect this invention discloses a process for removing arsenic and heavy metals from antifreeze solutions. In one aspect such a method includes adding an iron salt, e.g. (but not limited to) any iron III salt, ferric chloride, ferric sulfate, ferric silicate, or ferric chloride hexahydrate, to an antifreeze solution containing arsenic and heavy metals; in one aspect at ambient temperature with adequate mixing for dispersion throughout the solution. Next, a base, such as (but not limited to) any alkaline earth metal oxide or hydroxide in Group II A of the periodic table, calcium or magnesium oxide or hydroxide, is added to increase the pH upward to a level about 8 to 10. As the base is added, a precipitate forms at ambient temperature and is then removed by one of several standard filtration techniques. The arsenic and heavy metals co-precipitate with the iron and are removed by filtration. The precipitated material may include arsenic salts, heavy metal salts and iron salts; (and calcium salts if calcium oxide is used); and about less than 1% by weight ethylene glycol. The precipitated materials are removed by one of several common industrial filtration processes. Heavy metals are removed from wastewater with this same process. Heavy metals are removed from wastewater containing oxygenated hydrocarbons with this same process. As a substitute for the base fly ash, fluidized bed fly ash, silicates or any combination thereof may be used. The use of such substitutes does not result in the formation of hydrous precipitate as is encountered with the use of a base.

It is within the scope of this invention to provide processes in which, for antifreeze e.g. with 100 ppm arsenic, the ratio of ferric ions to arsenic ions ranges between 100 to 1 and 1 to 1, by weight.

The process may either be a batch process or a continuous process. The type of process selected depends upon a number of chemical and physical variables, including the size of the reactor, flow rates, efficiency of mixing, temperature, level of arsenic and of heavy metals, and other impurities in the antifreeze. The final product, a solution of ethylene glycol and water, is suitable for reuse [in certain embodiments after adequate inhibitors (such as chromates, hydrazine, phosphates, polyphosphates, molybdates and organics mixed with zinc, phosphates and dispersants) have been added]. In certain embodiments the arsenic content of the treated antifreeze is preferably less than 5 mg per liter and the heavy metals content is preferably less than 1 mg per liter.

The filtered solids from the precipitated materials contain a stabilized arsenic salt and are suitable for disposal in a non-hazardous (Class II) waste landfill. The precipitated materials may be tested to determine their stability. Additional testing such as the toxic characteristic leachate procedure (TCLP) may be run to verify the non-hazardous nature of the filtered solids. This represents a cost saving for disposal over other arsenic removal methods that do not render the final product non-hazardous.

In certain embodiments organic acids (acetic, formic, oxalic, glycolic) are removed from wastewater or from antifreeze as solids in solution. Levels of such organic acids as acetate, formate, oxylate and glycolate are reduced by 50% to 70% by weight to levels acceptable for antifreeze.

In a continuous process according to the present invention contaminated antifreeze and a ferric salt are continuously fed into a first vessel wherein they are mixed together. A resulting mixture is then fed into a reaction vessel into which is also continuously fed a base to raise pH. A typical mixer mixes the contents of the reaction vessel. A mixture with antifreeze and precipitates containing arsenic salts, organic acids, and heavy metal salts exits the reaction vessel and is filtered, producing purified re-usable antifreeze and disposable solids with contaminants therein. Fly ash or cement may be added to the arsenic-containing solids to further stabilize them. Heavy metals and/or organic acids are removed from wastewater (or from wastewater contaminated with oxygenated hydrocarbons) with these same processes.

In another embodiment the present invention discloses a process for removing heavy metals from soils and sediments. Heavy metals are leached from the soil or sediment with an acid solution. The resulting solution is filtered and treated using the above-described process to precipitate and remove the heavy metals. In one aspect the soil or sediment is treated in place with a solution of iron followed by a solution of lime.

It is, therefore, an object of at least certain preferred embodiments of the present invention to provide:

New, useful, unique, efficient, nonobvious processes for removing heavy metals from wastewater, from acid mine drainage, from wastewater containing oxygenated hydrocarbons, and for removing arsenic from antifreeze;

Such processes in which iron salts are used to precipitate heavy metals from wastewater; from wastewater containing oxygenated hydrocarbons; and arsenic from antifreeze;

Such processes which are either batch or continuous;

Such processes which produce a re-useable antifreeze solution;

Such processes which produce filtered solids containing stabilized heavy metals suitable for disposal in a landfill; and Processes in which a heavy metal is removed from wastewater by forming a heavy-metal-iron complex and co-precipitating it by addition of a base.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of embodiments preferred at the time of filing the application for this patent and given for the purpose of disclosure. The detail in these descriptions is not intended to thwart this patent's object to claim this invention no matter how others may later disguise it by variations in form or additions of further improvements.

A more particular description of embodiments of the invention briefly summarized above may be had by references to the embodiments which are described below and which form a part of this specification. These are certain preferred embodiments and are not to be used to improperly limit the scope of the invention which may have other equally effective or legally equivalent embodiments.

DESCRIPTION OF EMBODIMENTS
PREFERRED AT THE TIME OF FILING FOR
THIS PATENT

Method One

An AMD water was prepared with the composition as shown in Table 1 ("Initial Concentration" column). Indicated concentrations are in parts per million. "FB" means "fluidized bed". About one liter of the AMD water was treated (e.g. by mixing together in a suitable container with sufficient fly ash from coal combustion (e.g. about 200 grams) to increase the pH to greater than 7 with stirring. The solution which was initially blue-green turned clear when the pH neared 7. There was no visual evidence of the formation of the amorphous, semigelatinous precipitate that indicates typical undesirable hydrous iron hydroxide formation (as opposed to the preferred form of iron hydroxide precipitate which is partially hydrated more anhydrous than the undesirable form). The sample was filtered (e.g. using standard laboratory filtration systems using filter papers) to give a clear solution that was analyzed for metals and sulfate. The solid was air dried by leaving it on filter paper and allowing water to evaporate at laboratory ambient conditions. The results, summarized in Table 1 showed greater than 99% removal of the metals including iron and a surprising order of magnitude reduction in sulfate ion concentration.

TABLE 1

Results from Treatment of AMD with Solid Silicates and Fly Ash

| Ions | Initial Concentration AMD Water, ppm | After Treatment with Fly Ash, ppm | After Treatment With FB Fly Ash, ppm | After Treatment with Solid Silicates |
|---|---|---|---|---|
| Al | 280 | 77 | <0.5 | <0.5 |
| Ca | 3320 | 3888 | 5112 | 1380 |
| Cu | 740 | <0.5 | <0.5 | <0.5 |
| Fe | 1110 | <0.5 | <0.5 | <0.5 |
| Mg | 548 | <0.6 | 0.4 | 24 |
| Zn | 512 | 0.03 | 0.04 | 0.07 |
| $SO_4$ | 11,779 | 1650 | 2461 | 10,603 |
| pH | 3 | | | |

Method Two

The fly ash resulting from the incineration of coal in a fluidized bed is known to have both chemical and physical properties that are significantly different from fly ashes that are produced by more conventional incineration methods. The differences include significantly different bulk densities, surface properties, and much higher soluble (free) calcium oxide levels. Table 2 gives a comparison of the relative amounts of each basic solid required for the treatment.

TABLE 2

Relative Amounts of Solids Needed to Neutralize AMD Water, Remove Metals and Reduce

| Treatments | Relative Amount Required for Treatment (g/g water) |
|---|---|
| Typical Fly Ash | 0.2 |
| Fluidized Bed Combustion Fly Ash | 0.1 |
| Solid Silicate | 0.1 |

("g/g water" means gram of fly ash per gram of acid wastewater.) These differences demonstrate a superiority for the treatment of acid wastewater and AMD water in certain applications as the amount of ash required to neutralize the acid present in AMD water is significantly reduced. In addition, the increased surface area of this type of ash allows for faster reaction and the ability to ion exchange with the AMD water more efficiently.

Method Three

One liter of an AMD water (as in Method One) was treated in a container with sufficient fluidized bed fly ash solids (about 100 grams) to raise the pH to greater than 7 with stirring. Again, the blue-green solution became colorless as the pH neared 7. There was no visual evidence of an iron hydroxide precipitate. The sample was filtered to give a clear solution that was analyzed for metals and sulfate. The solid was air dried for about an hour. The results, summarized in Table 1, showed nearly complete removal of the heavy metals including iron and a major reduction in sulfate ion concentration.

A similar test was run using a liquid sodium metasilicate. There was an immediate formation of the undesirable iron hydroxide precipitate usually associated with the treatment of AMD waters with caustic materials.

The results of the three treatments are summarized in Table 1. Table 3 compares the analysis of a typical Class C fly ash from a standard incinerator (e.g. as commercially available to that produced from a standard fluidized bed incinerator (e.g. as commercially available). Tables 3 and 4 (amounts in weight percent) are the results of standard tests as defined in ASTM C-618-94 and give a comparison of the chemical and physical properties of typical fly ash and fluidized bed fly ash.

TABLE 3

Comparison of the Chemical Properties for Fly Ash And Fluidized Bed Combustion Fly Ash (Weight %)

| Chemical Analysis Components | Typical Fly Ash | Fluidized Bed Fly Ash | ASTM C 618-94 Specifications For Class C Fly Ash |
|---|---|---|---|
| Silicon Dioxide | 33.79 | 48.55 | |
| Aluminum Oxide | 19.39 | 17.05 | |
| Iron Oxide | 6.65 | 3.07 | |
| Sum of Above Three | 59.83 | 68.67 | 50 (minimum) |
| Magnesium Oxide | 4.76 | 2.86 | |
| Sulfur Trioxide | 1.57 | 5.10 | 5.0 (maximum) |
| Moisture Content | 0.03 | <0.01 | 3.0 (maximum) |
| Loss on Ignition | 0.14 | 1.15 | 6.0 (maximum) |
| Availability Alkalinity as | | | |
| Sodium Oxide | 1.37 | 0.40 | |
| Calcium Oxide | 26.97 | 18.07 | |
| Free Calcium Oxide | — | 2.41 | |

TABLE 4

Comparison of the Physical Properties for Typical Fly Ash and Fluidized Bed Combustion Fly Ash

| Physical Analysis Components | Typical Fly Ash | Fluidized Bed Fly Ash | ASTM C-618-94 Specifications For Class C Fly Ash |
|---|---|---|---|
| % Retained on 325 mesh Screen | 15.16 | 29.84 | 34 (maximum) |
| Water Requirement, % Control | 94 | 106 | 105 (maximum) |
| Specific Gravity | 2.6 | 2.51 | |
| Autoclave Expansion, % | 0.01 | −0.05 | |
| Strength Activity Index, 7 day | 93% | 75% | 75% (maximum) |

The solids removed from the treated AMD water were filtered and air dried. They were analyzed using the TCLP (toxic characteristic leachate procedure) to determine if the metals were stable (not leachable). Tests indicated that metals levels were sufficiently low so that the solids could be disposed of in a suitable landfill.

Antifreeze Treatment

In one batch process according to the present invention, approximately 30,000 gallons (113,640 liters) of antifreeze, fifty percent ethylene glycol and fifty percent water by volume, with arsenic and heavy metals contamination is pumped into a treating reactor and is stirred continuously with static mixers. The antifreeze contains 100 mg per liter of soluble arsenic. 285 pounds of iron (III) chloride is added and stirred to insure adequate mixing. Calcium oxide (e.g. about 300 pounds) is added and the mixture stirred vigorously to insure the calcium oxide dissolves in the reaction mixture. When the pH reaches a level between about 8 and 10, calcium oxide addition is stopped. The mixture is stirred for a few more minutes as a precipitate develops composed primarily of iron salts. The precipitation process is assisted by the addition of 0.5 pounds of a precipitation enhancing low molecular weight polyacrylate [such as any commercially available low molecular weight cationic polyacrylamide (e.g. molec. wt. of 500,000 to 5,000,000) which aids filtration and produces a more solid product]. The resulting reaction mixture is filtered using a filter press to give an ethylene glycol and water solution that is essentially free of arsenic (less than five parts per million arsenic by weight). Each process step is done at ambient temperature.

The purified antifreeze solution is ready for reuse. Depending upon the application, corrosion inhibitors and other stabilizers may be added to the re-useable antifreeze. The filter precipitate may be tested to insure that the arsenic is fixed (TCLP test). The precipitate may be treated with fly ash or cement to solidify it for disposal in an environmentally acceptable manner.

Most preferably processes according to this invention reduce arsenic levels in antifreeze to less than 5 ppm and reduce levels of heavy metals to less than 1 ppm.

In a continuous process according to the present invention contaminated antifreeze (with a flow rate of about 22 gallons per minute) and a ferric salt (with a flow rate of about 0.209 pounds per minute) are continuously fed into a first vessel wherein they are mixed together. A resulting mixture is then fed into a reaction vessel (at about 22 gallons per minute) into which is also continuously fed a base e.g. calcium oxide (at about 0.22 pounds per minute) to raise pH (e.g. from about 5–7 to 8–10). A typical mixer mixes the contents of the reaction vessel. A mixture with antifreeze and precipitates containing arsenic salts, organic acids, and heavy metal salts exits the reaction vessel and is filtered, producing purified, re-usable antifreeze and disposable solids with contaminants therein. Fly ash or cement may be added to the solids to further stabilize the solids.

The present invention, in certain embodiments discloses a process for removing heavy metal from wastewater, which includes introducing heavy-metal-contaminated wastewater into a reactor vessel; introducing a ferric salt into the wastewater in the reactor vessel to produce a mixture with wastewater and heavy-metal-containing precipitated solids, the mixture having a pH of between about 5 to 7; adding a base to the wastewater and ferric salt to adjust pH to between about 8 and 10 to enhance heavy-metal-containing precipitated solids formation, and filtering the reaction mixture to filter out the heavy-metal-containing precipitated solids from wastewater in the reaction mixture, producing re-useable wastewater; such a process also including stirring together the ferric salt and wastewater; such a process also including adding a low molecular weight polyacrylate precipitation enhancer to the reactor vessel; such a process wherein the re-useable wastewater contains less than five parts per million heavy metal by weight; such a process wherein the base is any alkaline earth metal oxide or hydroxide in Group II A of the periodic table; such a process wherein the base is calcium oxide, calcium hydroxide, magnesium oxide, or magnesium hydroxide; such a process wherein a ratio by weight of ferric ion to arsenic ion in the reactor vessel ranges between 100 to 1 and 1 to 1; such a process wherein the process is a batch process; such a process wherein the process is a continuous process with the continuous feeding of wastewater and ferric salt into the vessel and the continuous removal of a reaction product therefrom; such a process including testing the heavy-metal-containing precipitated solids to determine their stability; such a process including treating the heavy-metal-containing precipitated solids with fly ash or cement to stabilize the heavy-metal-containing precipitated solids; such a process wherein the wastewater contains oxygenated hydrocarbons; such a process including removing organic acids from the wastewater; such a process wherein the organic acids including acetic acid, formic acid, oxalic acid, or glycolic acid; and such a process wherein the precipitated solids are non-hazardous and suitable for disposal in a class II waste landfill.

The present invention, in certain embodiments, discloses a process for removing heavy metal from wastewater which includes introducing heavy-metal-contaminated wastewater into a reactor vessel; introducing a ferric salt into the wastewater in the reactor vessel to produce a mixture with wastewater and a heavy-metal-containing precipitated solids, the mixture having a pH of between about 5 to 7, a ratio by weight of ferric ion to heavy metal ion in the reactor vessel ranges between 100 to 1 and 1 to 1; stirring together the ferric salt and wastewater; adding a base to the wastewater and ferric salt to adjust pH to between about 8 and 10 to enhance heavy-metal-containing precipitated solids formation; adding a low molecular weight polyacrylate precipitation enhancer to the reactor vessel; and filtering the reaction mixture to filter out the heavy-metal-containing precipitated solids from wastewater in the reaction mixture, producing re-useable wastewater containing less than five parts per million heavy metal by weight.

In certain embodiments of the present invention for treating acid wastewater and AMD, the amount of fly ash used may range from a low of at least about 50 grams of fly ash per 1000 grams of AMD water or acid wastewater for a highly basic fly ash and an acid wastewater or AMD with a low metals content, to over 2000 grams of fly ash per 1000 grams of acid wastewater or AMD for a fly ash with lower basic content and an acid wastewater or AMD with a high metals content.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

U.S. Pat. No. 5,474,684 and pending U.S. application Ser. No. 08/570,231 are fully incorporated herein in their entirety for all purposes.

What is claimed is:

1. A process for treating acid wastewater containing heavy metals, the process comprising adding an effective amount of fluidized bed fly ash to the acid wastewater to raise the pH to at least about 7, mixing together the fluidized bed fly ash and acid wastewater to produce a solid residue containing said heavy metals and neutralized waste water, wherein hydrous gelatinous iron hydroxide precipitate is not formed, and removing said solid residue from said neutralized wastewater to reduce heavy metals content of the neutralized wastewater to at most 100 parts per million.

2. The process of claim 1 wherein the heavy metals are reduced to less than 10 parts per million.

3. The process of claim 1 wherein the acid wastewater contains soluble iron and sufficient fluidized bed fly ash addition reduces soluble iron content in the neutralized wastewater to a level of at most 10 parts per million.

4. The process of claim 3 wherein the soluble iron content is reduced to less than 0.5 parts per million.

5. The process of claim 1 wherein the acid wastewater contains sulfate and adding fluidized bed fly ash reduces amount of sulfate ions in the neutralized wastewater.

6. The process of claim 5 wherein sulfate ion level is reduced to at most 2000 parts per million.

7. The process of claim 6 wherein the sulfate ion level is at most 1200 parts per million.

8. The process of claim 1 including adding solid silicate salts to the acid wastewater.

9. The process of claim 1 wherein the process is a batch process conducted in a container.

10. The process of claim 1 wherein the acid wastewater is acid mine drainage.

11. The process of claim 1 wherein 0.1 gram of fluidized bed fly ash is used for each gram of acid wastewater.

12. A process for treating acid wastewater containing heavy metals, soluble iron, and sulfates, the process comprising adding an effective amount of fluidized bed fly ash to the acid wastewater to raise the pH to at least about 7, mixing together the fluidized bed fly ash and acid wastewater to produce a solid residue containing said heavy metals, soluble iron, and sulfates, and neutralized waste water, wherein hydrous gelatinous iron hydroxide precipitate is not formed, and removing said solid residue from said neutralized wastewater to reduce heavy metals content of the neutralized wastewater to at most 100 parts per million, to reduce soluble iron content in the neutralized wastewater to a level of at most 10 parts per million, and to reduce amount of sulfate ions in the neutralized wastewater.

13. The process of claim 12 further comprising adding silicate to the acid wastewater.

* * * * *